United States Patent
Sapra et al.

(10) Patent No.: US 12,207,104 B2
(45) Date of Patent: Jan. 21, 2025

(54) METHODS, SYSTEMS, AND COMPUTER READABLE MEDIA FOR PROVIDING PRIORITY RESOLVER FOR RESOLVING PRIORITIES AMONG NETWORK FUNCTION (NF) INSTANCES

(71) Applicant: Oracle International Corporation, Redwood Shores, CA (US)

(72) Inventors: Kawal Sapra, Bangalore (IN); Anup Shivarajapura, Bangalore (IN); Nitin Gupta, Bangalore (IN); Venkatesh Aravamudhan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 411 days.

(21) Appl. No.: 17/485,284

(22) Filed: Sep. 24, 2021

(65) Prior Publication Data
US 2023/0096969 A1 Mar. 30, 2023

(51) Int. Cl.
*H04L 41/12* (2022.01)
*H04L 41/40* (2022.01)
(Continued)

(52) U.S. Cl.
CPC ......... *H04W 24/02* (2013.01); *H04W 28/084* (2023.05); *H04L 47/10* (2013.01); *H04L 47/83* (2022.05)

(58) Field of Classification Search
CPC ...... H04W 24/02; H04W 28/084; H04L 47/10
See application file for complete search history.

(56) References Cited

U.S. PATENT DOCUMENTS 6,014,558 A  1/2000  Thomas
8,069,101 B1 11/2011  Von Groll et al.
(Continued)

FOREIGN PATENT DOCUMENTS

CN  105814931 A   7/2016
CN  108632312 A  10/2018
(Continued)

OTHER PUBLICATIONS

5G; 5G System; Network function repository services, Sep. 2018, 3GPP TS 29.510 version 15.0.0 Release 15 (Year: 2018).*
(Continued)

*Primary Examiner* — Yemane Mesfin
*Assistant Examiner* — Jia Hao Deng
(74) *Attorney, Agent, or Firm* — Jenkins, Taylor & Hunt, P.A.

(57) ABSTRACT

A method for resolving priorities among network function (NF) instances includes, at a priority resolver implemented using at least one processor, providing a priority resolution application programming interface (API) that allows NF instances to request priority resolution. The method further includes receiving, via the API and from a plurality of NF instances, requests for priority resolution. The method further includes using a priority resolution algorithm to determine a relative priority for each of the NF instances. The method further includes generating and transmitting to each of the NF instances a priority resolution response including the relative priority determined for the NF instance.

20 Claims, 7 Drawing Sheets

(51) Int. Cl.
*H04L 41/5022* (2022.01)
*H04W 24/02* (2009.01)
*H04W 28/084* (2023.01)
*H04L 47/10* (2022.01)
*H04L 47/83* (2022.01)

(56) References Cited

U.S. PATENT DOCUMENTS

| | | |
|---|---|---|
| 8,069,181 B1 | 11/2011 | Krishnan et al. |
| 9,124,537 B2 | 9/2015 | Kolze |
| 9,246,762 B1 | 1/2016 | Watkins |
| 10,313,362 B2 | 6/2019 | Ahuja et al. |
| 10,609,530 B1 | 3/2020 | Patil et al. |
| 10,637,753 B1 | 4/2020 | Taft et al. |
| 10,686,667 B1 | 6/2020 | Subramaniam |
| 10,772,062 B1 | 9/2020 | Albasheir et al. |
| 11,076,281 B1 | 7/2021 | Yau |
| 11,109,307 B2 | 8/2021 | Rodrigo et al. |
| 11,271,846 B2 | 3/2022 | Krishan |
| 11,470,544 B2 | 10/2022 | Singh et al. |
| 11,483,694 B2 | 10/2022 | Krishan |
| 11,496,954 B2 | 11/2022 | Gupta et al. |
| 11,528,334 B2 | 12/2022 | Krishan |
| 11,570,262 B2 | 1/2023 | Sapra et al. |
| 11,589,298 B2 | 2/2023 | Sapra et al. |
| 11,622,276 B1 | 4/2023 | Wan |
| 11,652,895 B1 | 5/2023 | Sapra et al. |
| 11,871,309 B2 | 1/2024 | Jayaramachar et al. |
| 11,888,946 B2 | 1/2024 | Goe |
| 11,888,957 B2 | 1/2024 | Krishan |
| 11,930,083 B2 | 3/2024 | Goel et al. |
| 12,127,297 B2 | 10/2024 | Goel |
| 2005/0181776 A1 | 8/2005 | Verma et al. |
| 2005/0193096 A1 | 9/2005 | Yu et al. |
| 2006/0010224 A1 | 1/2006 | Sekar et al. |
| 2007/0050331 A1 | 3/2007 | Bauman et al. |
| 2008/0101293 A1 | 5/2008 | Woo et al. |
| 2009/0222584 A1 | 9/2009 | Josefsberg et al. |
| 2013/0080641 A1 | 3/2013 | Lui et al. |
| 2013/0086245 A1 | 4/2013 | Lu et al. |
| 2013/0198269 A1 | 8/2013 | Fleischman et al. |
| 2013/0272123 A1 | 10/2013 | Lee et al. |
| 2014/0040975 A1 | 2/2014 | Raleigh et al. |
| 2015/0326441 A1 | 11/2015 | Smith et al. |
| 2016/0156513 A1 | 6/2016 | Zhang et al. |
| 2016/0350683 A1 | 12/2016 | Bester et al. |
| 2016/0380906 A1 | 12/2016 | Hodique et al. |
| 2017/0077751 A1 | 3/2017 | Forbes |
| 2017/0221015 A1 | 8/2017 | June et al. |
| 2018/0205637 A1 | 7/2018 | Li |
| 2018/0262625 A1 | 9/2018 | McCarley et al. |
| 2018/0285794 A1 | 10/2018 | Gray-Donald et al. |
| 2018/0324247 A1 | 11/2018 | Hood et al. |
| 2019/0007366 A1 | 1/2019 | Voegele et al. |
| 2019/0140895 A1 | 5/2019 | Ennis, Jr. et al. |
| 2019/0158364 A1 | 5/2019 | Zhang et al. |
| 2019/0166001 A1 | 5/2019 | Ma et al. |
| 2019/0212802 A1 | 7/2019 | Srinivasan et al. |
| 2019/0222633 A1 | 7/2019 | Howes et al. |
| 2019/0230556 A1 | 7/2019 | Lee |
| 2019/0342229 A1 | 11/2019 | Khinvasara et al. |
| 2019/0394284 A1 | 12/2019 | Baghel et al. |
| 2020/0036754 A1 | 1/2020 | Livanos |
| 2020/0059420 A1 | 2/2020 | Abraham |
| 2020/0106812 A1 | 4/2020 | Verma et al. |
| 2020/0127916 A1 | 4/2020 | Krishan |
| 2020/0136911 A1 | 4/2020 | Assali et al. |
| 2020/0137174 A1 | 4/2020 | Stammers et al. |
| 2020/0305033 A1 | 9/2020 | Keller et al. |
| 2020/0314615 A1 | 10/2020 | Patil et al. |
| 2020/0336554 A1 | 10/2020 | Deshpande et al. |
| 2020/0367148 A1 | 11/2020 | Baek et al. |
| 2021/0007023 A1 | 1/2021 | Umapathy et al. |
| 2021/0044481 A1 | 2/2021 | Xu et al. |
| 2021/0076248 A1 | 3/2021 | Kallam et al. |
| 2021/0099856 A1 | 4/2021 | Cakulev et al. |
| 2021/0136602 A1 | 5/2021 | Pokkunuri et al. |
| 2021/0168055 A1 | 6/2021 | Lair |
| 2021/0204200 A1 | 7/2021 | Krishan et al. |
| 2021/0235254 A1 | 7/2021 | Farooq |
| 2021/0273977 A1 | 9/2021 | Karasaridis et al. |
| 2021/0274392 A1 | 9/2021 | Dao et al. |
| 2021/0297935 A1 | 9/2021 | Belling et al. |
| 2021/0367916 A1 | 11/2021 | Belling et al. |
| 2021/0368427 A1 | 11/2021 | Rommer et al. |
| 2021/0385286 A1 | 12/2021 | Wang et al. |
| 2021/0385732 A1 | 12/2021 | Reyes et al. |
| 2022/0038545 A1 | 2/2022 | Krishan |
| 2022/0039101 A1 | 2/2022 | Wang et al. |
| 2022/0070648 A1 | 3/2022 | Krishan |
| 2022/0103644 A1 | 3/2022 | Park et al. |
| 2022/0110082 A1 | 4/2022 | Belling et al. |
| 2022/0131945 A1 | 4/2022 | Sapra et al. |
| 2022/0159464 A1 | 5/2022 | Rajput et al. |
| 2022/0191294 A1 | 6/2022 | Yang et al. |
| 2022/0264432 A1 | 8/2022 | Reyes et al. |
| 2022/0286949 A1 | 9/2022 | Sapra et al. |
| 2022/0295384 A1 | 9/2022 | Gupta et al. |
| 2022/0330085 A1 | 10/2022 | Li |
| 2022/0346188 A1 | 10/2022 | Malhotra |
| 2022/0394453 A1 | 12/2022 | Goel |
| 2022/0394597 A1 | 12/2022 | Goel |
| 2022/0417783 A1 | 12/2022 | Srivastava et al. |
| 2023/0052267 A1 | 2/2023 | Goel et al. |
| 2023/0099468 A1 | 3/2023 | Khare |
| 2023/0099676 A1 | 3/2023 | Jayaramachar et al. |
| 2023/0179681 A1 | 6/2023 | Krishan |

FOREIGN PATENT DOCUMENTS

| | | |
|---|---|---|
| CN | 114039874 A | 2/2022 |
| CN | 112584371 B | 5/2022 |
| CN | ZL202180068287.X | 6/2024 |
| EP | 3 716 692 A1 | 9/2020 |
| EP | 4189943 | 7/2024 |
| EP | 4208997 B1 | 8/2024 |
| KR | 20190057818 A | 5/2019 |
| KR | 20190088060 A | 7/2019 |
| KR | 20220006908 A | 1/2022 |
| WO | WO 2019/144321 A1 | 1/2019 |
| WO | WO 2019/076276 A1 | 4/2019 |
| WO | WO 2019/215308 A1 | 11/2019 |
| WO | WO 2020/001842 A1 | 1/2020 |
| WO | WO 2020/030291 A1 | 2/2020 |
| WO | WO 2020/083516 A1 | 4/2020 |
| WO | WO 2020/192254 A1 | 10/2020 |
| WO | WO 2021/011933 A1 | 1/2021 |
| WO | WO 2021/092441 A1 | 5/2021 |
| WO | WO 2021/110287 A1 | 6/2021 |
| WO | WO 2021219385 A1 | 11/2021 |
| WO | WO 2022/025987 A1 | 2/2022 |
| WO | WO 2022/050987 A1 | 3/2022 |
| WO | WO 2022/093319 A1 | 5/2022 |
| WO | WO 2022152870 A1 | 7/2022 |
| WO | WO 2022/179713 A1 | 9/2022 |
| WO | WO 2022/197531 A1 | 9/2022 |
| WO | WO 2022/256306 A1 | 12/2022 |
| WO | WO 2023/031836 A1 | 3/2023 |

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.1.0, pp. 1-243 (Mar. 2021).

Non-Final Office Action for U.S. Appl. No. 17/487,142 (May 8, 2023).

Examiner-Initiated Interview Summary for U.S. Appl. No. 17/337,356 dated May 2, 2023.

Non-Final Office Action for U.S. Appl. No. 17/468,076 (Apr. 28, 2023).

Final Office Action for U.S. Appl. No. 17/397,968 (Apr. 27, 2023).

(56) References Cited

OTHER PUBLICATIONS

Non-Final Office Action for U.S. Appl. No. 17/397,968 (Aug. 23, 2023).
Notice of Publication for European Patent Application Serial No. 21731870.8 (Aug. 9, 2023).
Notice of Publication for European Patent Application No. 21713526.8 (May 10, 2023).
Examiner-Initiated Interview Summary for U.S. Appl. No. 17/672,639 (Apr. 21, 2023).
Notice of Allowance and Fee(s) Due for U.S. Appl. No. 17/082,871 (Sep. 28, 2022).
Notification of Transmittal of the International Search Report and the Written Opinion of the International Searching Authority, or the Declaration for International Application No. PCT/US2022/031566 (Sep. 2, 2022).
Examiner-Initiated Interview Summary for U.S. Appl. No. 17/672,639 (Aug. 10, 2022).
Notice of Allowance and Fee(s) Due for U.S. Appl. No. 16/945,794 (Aug. 2, 2022).
Non-Final Office Action for U.S. Appl. No. 17/672,639 (Aug. 25, 2022).
Notice of Allowance for U.S. Appl. No. 17/200,777 (Jun. 30, 2022).
Final Office Action for U.S. Appl. No. 17/082,871 (Jun. 6, 2022).
Notice of Allowance for U.S. Appl. No. 17/009,725 (Jun. 13, 2022).
Commonly-Assigned, co-pending U.S. Appl. No. 17/672,639 for "Methods, Systems, and Computer Readable Media for Dynamic Optimized Network Function Discovery for Consumer Network Functions" (Unpublished, filed Feb. 5, 2022).
"3rd Generation Partnership Project; Technical Specification Group Core Network and Terminals; 5G System; Network Function Repository Services, Stage 3 (Release 16)," 3GPP TS 29.510, V16.6.0, pp. 1-227 (Jan. 2021).
Notification of Transmittal of the International Search Report and the Written Opinion of the International Searching Authority, or the Declaration for International Application No. PCT/US2022/019848 (Jun. 14, 2022).
Advisory Action and Examiner-Initiated Interview Summary for U.S. Appl. No. 16/945,794 (May 20, 2022).
Final Office Action for U.S. Appl. No. 16/945,794 (Feb. 8, 2022).
Non-Final Office Action for U.S. Appl. No. 17/082,871 (Feb. 7, 2022).
Commonly-Assigned, co-pending U.S. Appl. No. 17/543,989 for "Methods, Systems, and Computer Readable Media for Dynamic Adjustment to Network Function Profile for Discovery Responses" (Unpublished, filed Dec. 17, 2021).
Commonly-Assigned, co-pending U.S. Appl. No. 17/397,968 for "Methods, Systems, and Computer Readable Media for Processing Network Function (NF) Discovery Requests at NF Repository Function (NRF) Using Prioritized Lists of Preferred Locations" (Unpublished, filed Aug. 9, 2021).
Commonly-Assigned, co-pending U.S. Appl. No. 17/356,461 for "Methods, Systems and Computer Readable Media for Optimizing Network Traffic Distribution using Timeslot-Based Tracked Producer Network Function (NF) Performance During Producer NF Selection" (Unpublished, filed Jun. 23, 2021).
Commonly-Assigned, Co-pending U.S. Appl. No. 17/337,356 for "Methods, Systems, and Computer Readable Media for Applying or Overriding Preferred Locality Criteria in Processing Network Function (NF) Discovery Requests," (Unpublished, filed Jun. 6, 2021).
"3rd Generation Partnership Project; Technical Specification Group Services and System Aspects; Security architecture and procedures for 5G system (Release 17)," 3GPP TS 33.501, V17.3.0, pp. 1-258 (Sep. 2021).
"3rd Generation Partnership Project; Technical Specification Group Core Network and Terminals; 5G System; Network Function Repository Services; Stage 3 (Release 17)," 3GPP TS 29.510, V17.3.0, pp. 1-271 (Sep. 2021).

"3rd Generation Partnership Project; Technical Specification Group Services and System Aspects; System architecture for the 5G System (5GS); Stage 2 (Release 17)," 3GPP TS 23.501, V17.2.0, pp. 1-542 (Sep. 2021).
"3rd Generation Partnership Project; Technical Specification Group Core Network and Terminals; 5G System; Technical Realization of Service Based Architecture; Stage 3 (Release 17)," 3GPP TS 29.500, V17.4.0, pp. 1-109 (Sep. 2021).
"3rd Generation Partnership Project; Technical Specification Group Services and System Aspects; Procedures for the 5G System (5GS); Stage 2 (Release 17)," 3GPP TS 23.502, V17.0.0, pp. 1-646 (Mar. 2021).
Examiner-Initiated Interview Summary for U.S. Appl. No. 17/397,968 (Mar. 21, 2023).
Examiner-Initiated Interview Summary for U.S. Appl. No. 17/672,639 (Mar. 7, 2023).
Non-Final Office Action for U.S. Appl. No. 17/337,356 (Jan. 17, 2023).
Notice of Publication for U.S. Appl. No. 17/356,461 (Dec. 29, 2022).
Ex Parte Quayle Action for U.S. Appl. No. 17/672,639 (Dec. 23, 2022).
Notice of Publication for International Application Serial No. PCT/US2022/031566 (Dec. 8, 2022).
Non-Final Office Action for U.S. Appl. No. 17/397,968 (Dec. 9, 2022).
"3rd Generation Partnership Project; Technical Specification Group Core Network and Terminals; 5G System; Network Function Repository Services; Stage 3 (Release 17)," 3GPP TS 29.510, V17.4.0, pp. 1-284 (Dec. 2021).
Notice of Allowance and Fee(s) Due for U.S. Appl. No. 17/337,356 (Sep. 14, 2023).
Notice of Allowance and Fee(s) Due for U.S. Appl. No. 17/543,989 (Sep. 13, 2023).
Notice of Allowance and Fee(s) Due for U.S. Appl. No. 17/487,142 (Sep. 1, 2023).
Notice of Publication for European Patent Application Serial No. 22717043.8 (Dec. 20, 2023).
Advisory Action/AFCP 2.0 Decision for U.S. Appl. No. 17/468,076 (Jan. 9, 2024).
Applicant-Initiated Interview Summary for U.S. Appl. No. 17/468,076 (Jan. 2, 2024).
Notice of Allowance for U.S. Appl. No. 17/397,968 dated Dec. 28, 2023.
Applicant-Initiated Interview Summary for U.S. Appl. No. 17/397,968 dated Dec. 14, 2023.
Non-Final Office Action for U.S. Appl. No. 17/543,989 (Mar. 28, 2023).
Examination Report for Patent Application No. IN202147036462 (Dec. 29, 2022) PCT/IN.
Office Action for Chinese Patent Application Serial No. 202180068287.X (Sep. 28, 2023).
Final Office Action for U.S. Appl. No. 17/468,076 (Oct. 5, 2023).
Notice of Allowance and Fee(s) Due for U.S. Appl. No. 16/356,446 (Sep. 30, 2021).
Notification of Transmittal of the International Search Report and the Written Opinion of the International Searching Authority, or the Declaration for International Application No. PCT/US2021/033031 (May 18, 2021).
Non-Final Office Action for U.S. Appl. No. 16/945,794 (Sep. 15, 2021).
Commonly-Assigned, co-pending U.S. Appl. No. 17/468,076 for "Methods, Systems, and Computer Readable Media for Using Service Communications Proxy (SCP) or Security Edge Protection Proxy (SEPP) to Apply or Override Preferred-Locality Attribute During Network Function (NF) Discovery" (Unpublished, filed Sep. 7, 2021).
Commonly-Assigned, co-pending U.S. Appl. No. 17/487,142 for "Methods, Systems, and Computer Readable Media for Network Function Discovery Using Preferred-Locality Information" (Unpublished, filed Sep. 28, 2021).

(56) References Cited

OTHER PUBLICATIONS

Notification of Transmittal of the International Search Report and the Written Opinion of the International Searching Authority, or the Declaration for International Application No. PCT/US2021/024000 (Jun. 24, 2021).
Non-Final Office Action for U.S. Appl. No. 16/356,446 (Jun. 16, 2021).
Commonly-Assigned, co-pending U.S. Appl. No. 17/337,356 for "Methods, Systems, and Computer Readable Media for Applying or Overriding Preferred Locality Criteria in Processing Network Function (NF) Discovery Requests," (Unpublished, filed Jun. 2, 2021).
Notification of Transmittal of the International Search Report and the Written Opinion of the International Searching Authority, or the Declaration for U.S. Patent Application Serial No. PCT/US2021/020120 (Jun. 1, 2021).
"TCP congestion control," Wikipedia, pp. 1-15 (Mar. 4, 2021).
"3rd Generation Partnership Project; Technical Specification Group Core Network and Terminals; Numbering, addressing and identification; (Release 17)," 3GPP TS 23.003, V17.1.0, pp. 1-143 (Mar. 2021).
"3rd Generation Partnership Project; Technical Specification Group Core Network and Terminals; 5G System; Session Management Services; Stage 3 (Release 17)," 3GPP 29.502, V17.1.0, pp. 1-299 (Jun. 2021).
"3rd Generation Partnership Project; Technical Specification Group Core Network and Terminals; 5G System; Principles and Guidelines for Services Definition; Stage 3 (Release 17)," 3GPP TS 29.501, V17.2.0, pp. 1-78 (Jun. 2021).
"3rd Generation Partnership Project; Technical Specification Group Core Network and Terminals; 5G System; Technical Realization of Service Based Architecture; Stage 3 (Release 17)," 3GPP TS 29.500, V17.2.0, pp. 1-100 (Mar. 2021).
"3rd Generation Partnership Project; Technical Specification Group Services and System Aspects; Security architecture and procedures for 5G system (Release 17)," 3GPP TS 33.501, V17.1.0, pp. 1-256 (Mar. 2021).
"3rd Generation Partnership Project; Technical Specification Group Core Network and Terminals; 5G System; Public Land Mobile Network (PLMN) Interconnection; Stage 3 (Release 17)," 3GPP TS 29.573, V17.0.0, pp. 1-100 (Mar. 2021).
"3rd Generation Partnership Project; Technical Specification Group Core Network and Terminals; 5G System; Network Function Repository Services; Stage 3 (Release 17)," 3GPP TS 23.510, V17.1.0, pp. 1-243 (Mar. 2021).
"3rd Generation Partnership Project; Technical Specification Group Services and System Aspects; System architecture for the 5G System (5GS); Stage 2 (Release 17)," 3GPP TS 23.501, V17.0.0, pp. 1-489 (Mar. 2021).
Commonly-Assigned, co-pending U.S. Appl. No. 17/203,693 for "Methods, Systems, and Computer Readable Media for Hypertext Transfer Protocol (HTTP) Stream Tuning for Load and Overload Control," (Unpublished, filed Mar. 16, 2021).
Commonly-Assigned, co-pending U.S. Appl. No. 17/200,777 for "Methods, Systems, and Computer Readable Media for Supporting Multiple Preferred Localities for Network Function (NF) Discovery and Selection Procedures" (Unpublished, filed Mar. 13, 2021).
"3rd Generation Partnership Project; Technical Specification Group Core Network and Terminals; 5G System; Network Function Repository Services; Stage 3 (Release 17)," 3GPP TS 29.510, V17.0.0, pp. 1-229 (Dec. 2020).
"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).
Advisory Action for U.S. Appl. No. 16/356,446 (Dec. 22, 2020).
Commonly-Assigned, co-pending U.S. Appl. No. 17/082,871 for "Methods, Systems, and Computer Readable Media for Rank Processing for Network Function Selection," (Unpublished, filed Oct. 28, 2020).
Final Office Action for U.S. Appl. No. 16/356,446 (Sep. 8, 2020).
Commonly-Assigned, co-pending U.S. Appl. No. 17/009,725 for "Methods, Systems, and Computer Readable Media for Service Communications Proxy (SCP)-Specific Prioritized Network Function (NF) Discovery and Routing," (Unpublished, filed Sep. 1, 2020).
Commonly-Assigned, co-pending U.S. Appl. No. 16/945,794 for "Methods, Systems, And Computer Readable Media For Preferred Network Function (NF) Location Routing Using Service Communications Proxy (SCP)," (Unpublished, filed Jul. 31, 2020).
"3rd Generation Partnership Project; Technical Specification Group Core Network and Terminals; 5G System; Network Function Repository Services; Stage 3 (Release 16)," 3GPP TS 29.510 V16.4.0, pp. 1-206 (Jul. 2020).
"3rd Generation Partnership Project; Technical Specification Group Services and System Aspects; Procedures for the 5G System (5GS); Stage 2 (Release 16)," 3GPP TS 23.502 V16.4.0, pp. 1-582 (Mar. 2020).
"3rd Generation Partnership Project; Technical Specification Group Services and System Aspects; System architecture for the 5G System (5GS); Stage 2 (Release 16)," 3GPP TS 23.501 V16.4.0, pp. 1-430 (Mar. 2020).
Non-Final Office Action for U.S. Appl. No. 16/356,446 (May 11, 2020).
Nokia et al., "Discussion paper on authorization for Model D Indirect communications", 3GPP TSG SA WG3; S3-194380 (Nov. 11, 2019).
Commonly-Assigned, co-pending U.S. Appl. No. 16/356,446 for "Methods, Systems, And Computer Readable Media For Locality-Based Selection And Routing Of Traffic To Producer Network Functions (NFs)," (Unpublished, filed Mar. 18, 2019).
Belshe et al., "Hypertext Transfer Protocol Version 2 (HTTP/2)," Internet Engineering Task Force (IETF), RFC 7540, pp. 1-96 (May 2015).
Fielding et al. "Hypertext Transfer Protocol (HTTP/1.1): Semantics and Content", Internet Engineering Taskforce (IETF) Request for Comments: 7231, IEFT RFC 7231, pp. 1-102 (Jun. 2014).
Vixie et al., "Dynamic Updates in the Domain Name System (DNS Update)," Network Working Group, RFC 2136, pp. 1-26 (Apr. 1997).
Applicant-Initiated Interview Summary for U.S. Appl. No. 17/397,968 (Jul. 24, 2023).
Applicant-Initiated Interview Summary for U.S. Appl. No. 17/543,989 (Jul. 24, 2023).
Advisory Action for U.S. Appl. No. 17/397,968 (Jul. 14, 2023).
Notice of Publication for European Patent Application Serial No. 21718460.5 (Jun. 14, 2023).
First Examination Report for Indian Patent Application Serial No. 202247065596 (May 30, 2023).
Applicant-Initiated Interview Summary for U.S. Appl. No. 17/468,076 (Sep. 22, 2023).
Final Office Action for U.S. Appl. No. 17/337,356 (Jun. 26, 2023).
First Examination Report for Indian Patent Application Serial No. 202347016655 (Mar. 12, 2024).
Decision to Grant for European Patent Application Serial No. 21718460.5 (Jul. 18, 2024).
Decision to Grant for European Patent Application Serial No. 21713526.8 (Jun. 27, 2024).
Office Action for Indian Patent Application Serial No. 202347027680 (May 14, 2024).
Notice of Allowance for Chinese Patent Application Serial No. 202180068287.X (Apr. 15, 2024).
Notice of Allowance for U.S. Appl. No. 17/468,076 (Jun. 4, 2024).
Non-Final Office Action for U.S. Appl. No. 17/468,076 (Feb. 1, 2024).
Intent to Grant for European Patent Application Serial No. 21713526.8 (Feb. 21, 2024).
Intent to Grant for European Patent Application Serial No. 21718460.5 (Mar. 14, 2024).
Office Action for Chinese Patent Application Serial No. 202180038142.5 (Aug. 9, 2024).
Office Action for Japanese Patent Application Serial No. 2023506341 (Oct. 8, 2024).

(56) References Cited

OTHER PUBLICATIONS

Office Action for Japanese Patent Application No. 2023526073 (Nov. 12, 2024).

* cited by examiner

METHODS, SYSTEMS, AND COMPUTER READABLE MEDIA FOR PROVIDING PRIORITY RESOLVER FOR RESOLVING PRIORITIES AMONG NETWORK FUNCTION (NF) INSTANCES

TECHNICAL FIELD

The subject matter described herein relates to determining priorities of NF instances. More particularly, the subject matter described herein relates to resolving priorities among 5G NF instances.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can obtain information about producer NF instances that have registered with the NRF through the NF service discovery procedure. According to the NF service discovery procedure, a consumer NF sends an NF discovery request to the NRF. The NF discovery request includes query parameters that the NRF uses to locate NF profiles of producer NFs capable of providing the service identified by the query parameters. NF profiles are data structures that define the type of service provided by a producer NF instance and well as load and overload control information regarding the producer NF instance.

In addition to consumer NFs, another type of network node that can invoke the NF service discovery procedure to obtain information about NF service instances is a service communication proxy (SCP). The case where the SCP uses the NF service discovery procedure to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances. The communications model where consumer NFs communicate with producer NFs via the SCP is referred to as the indirect communications model.

In addition to the SCP, another example of an intermediate proxy node that routes traffic between producer and consumer NFs is the security edge protection proxy (SEPP). The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G communications networks that can occur during NF registration and subsequent NF discovery relates to assigning priorities to NF instances. Using 3GPP-defined procedures, each NF instance of a given type reports its priority to the NRF as part of the NF profile or service profile provided to the NRF in the NF register service operation. Each NF instance may also update its priority with the NRF using the NF update service operation. The priority value reported by each NF instance in the NF register or NF update service operations is individually configured or derived at the NF instance. As a result, multiple NF instances may report the same priority value, even when the priorities among the NF instances should be different based on load, capacity, service level, and/or other factors, in order to optimize network performance.

In light of these difficulties, there exists a need for improved methods, systems, and computer readable media for resolving priorities among NF instances.

SUMMARY

A method for resolving priorities among network function (NF) instances includes, at a priority resolver implemented using at least one processor, providing a priority resolution application programming interface (API) that allows NF instances to request priority resolution. The method further includes receiving, via the API and from a plurality of NF instances, requests for priority resolution. The method further includes using a priority resolution algorithm to determine a relative priority for each of the NF instances. The method further includes generating and transmitting to each of the NF instances a priority resolution response including the relative priority determined for the NF instance.

According to another aspect of the subject matter described herein, providing the API includes providing an interface for the NF instances to provide NF priority details to the priority resolver.

According to another aspect of the subject matter described herein, using the priority resolution algorithm to determine a relative priority for each of the NF instances includes assigning a relative priority value to each of the NF instances based on relative values of at least one NF instance health parameter.

According to another aspect of the subject matter described herein, the at least one NF health instance parameter includes load and capacity and wherein assigning a relative priority value to each of the NF instances based on relative values of the at least one NF instance health parameter includes calculating a load/capacity metric value for each of the NF instances using the following equation: load/capacity metric value=$x-(y/100*x)$, where x is capacity of an NF instance and y is load on the NF instance.

According to another aspect of the subject matter described herein, assigning a relative priority value to each of the NF instances based on relative values of the at least one NF health parameter includes generating a list of the load/capacity metric values of the NF instances in order of descending load/capacity metric values, and assigning a relative priority value to each of the NF instances based on a position of the load/capacity metric value for each of the NF instances in the list.

According to another aspect of the subject matter described herein, assigning a relative priority value to each of the NF instances in the list includes assigning a relative priority value within a Third Generation Partnership Project (3GPP)-defined range of values to an NF instance whose load/capacity metric value is in a first position in the list, and, for each NF instance having a load/capacity metric value after the first position in the list, assigning a relative priority value using the following equation: relative priority (n)=priority(n−1)+1, where n is an integer of at least 2, representing a position in the list of a load/capacity metric value for the NF instances whose load/capacity metric values are located after the first position in the list, priority (n) is the relative priority being computed for the NF instance whose load/capacity metric is located at an nth position in the list, and priority(n−1) is a relative priority of an NF instance whose load/capacity metric value is located at an (n−1)th position in the list.

According to another aspect of the subject matter described herein, receiving the requests for priority resolution includes receiving the requests for priority resolution in response to booting up of the NF instances.

According to another aspect of the subject matter described herein, the method for priority resolution among NF instances includes updating the relative priorities in response to a change in number, load, or capacity of the NF instances.

Accordingly to another aspect of the subject matter described herein, the method for resolving priorities among NF instances includes, at each of the NF instances, receiving one of the priority resolution responses including one of the relative priority values and transmitting an NF register message to an NRF including the relative priority value to an NF repository function NRF.

According to another aspect of the subject matter described herein, the priority resolver is implemented as a stand-alone network function or is co-located with a network function other than the priority resolver.

According to another aspect of the subject matter described herein, a system for resolving priorities among network function (NF) instances is provided. The system includes a network node including at least one processor and a memory. The system further includes a priority resolver implemented using the at least one processor for providing a priority resolution application programming interface (API) that allows NF instances to request priority resolution, receiving, via the API and from a plurality of NF instances, requests for priority resolution, using a priority resolution algorithm to determine a relative priority for each of the NF instances, and generating and transmitting to each of the NF instances a priority resolution response including the relative priority determined for the NF instance.

According to another aspect of the subject matter described herein, the API is configured for the NF instances to provide NF priority details to the priority resolver.

According to another aspect of the subject matter described herein, using the priority resolution algorithm to determine a relative priority for each of the NF instances includes assigning a relative priority value to each of the NF instances based on relative values of at least one NF instance health parameter.

According to another aspect of the subject matter described herein, the priority resolver is configured to assign a relative priority value to each of the NF instances by generating a list of the load/capacity metric values of the NF instances in order of descending load/capacity metric values, and assigning a relative priority value to each of the NF instances based on a position of the load/capacity metric value for each of the NF instances in the list.

According to another aspect of the subject matter described herein, the priority resolver is configured to assign a relative priority value within a Third Generation Partnership Project (3GPP)-defined range to an NF instance whose load/capacity metric value is located at a first position in the list, and, for each NF instance having a load capacity metric value located after the first position in the list, compute the relative priority using the following equation: relative priority(n)=priority(n−1)+1, where n is an integer of at least 2, representing a position in the list of a load/capacity metric value for the NF instances whose load capacity metric values are located after the first position in the list, priority (n) is the relative priority being computed for the NF instance whose load/capacity metric is located at an nth position in the list, and priority(n−1) is a relative priority of an NF instance whose load/capacity metric value is located at an (n−1)th position in the list.

According to another aspect of the subject matter described herein, the priority resolver is configured to receive the requests for priority resolution in response to booting up of the NF instances.

According to another aspect of the subject matter described herein, the priority resolver is configured to update the relative priorities in response to a change in number, load, or capacity of the NF instances.

According to another aspect of the subject matter described herein, the priority resolver is implemented as a stand-alone network function or is co-located with a network function other than the priority resolver.

According to another aspect of the subject matter described herein, a non-transitory computer readable medium having stored thereon executable instructions that when executed by a processor of a computer control the computer to perform steps is provided. The steps include providing a priority resolution application programming interface (API) that allows network function (NF) instances to request priority resolution. The steps further include receiving, via the API and from a plurality of NF instances, requests for priority resolution. The steps further include using a priority resolution algorithm to determine a relative priority for each of the NF instances. The steps further include generating and transmitting to each of the NF instances a priority resolution response including the relative priority determined for the NF instance.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
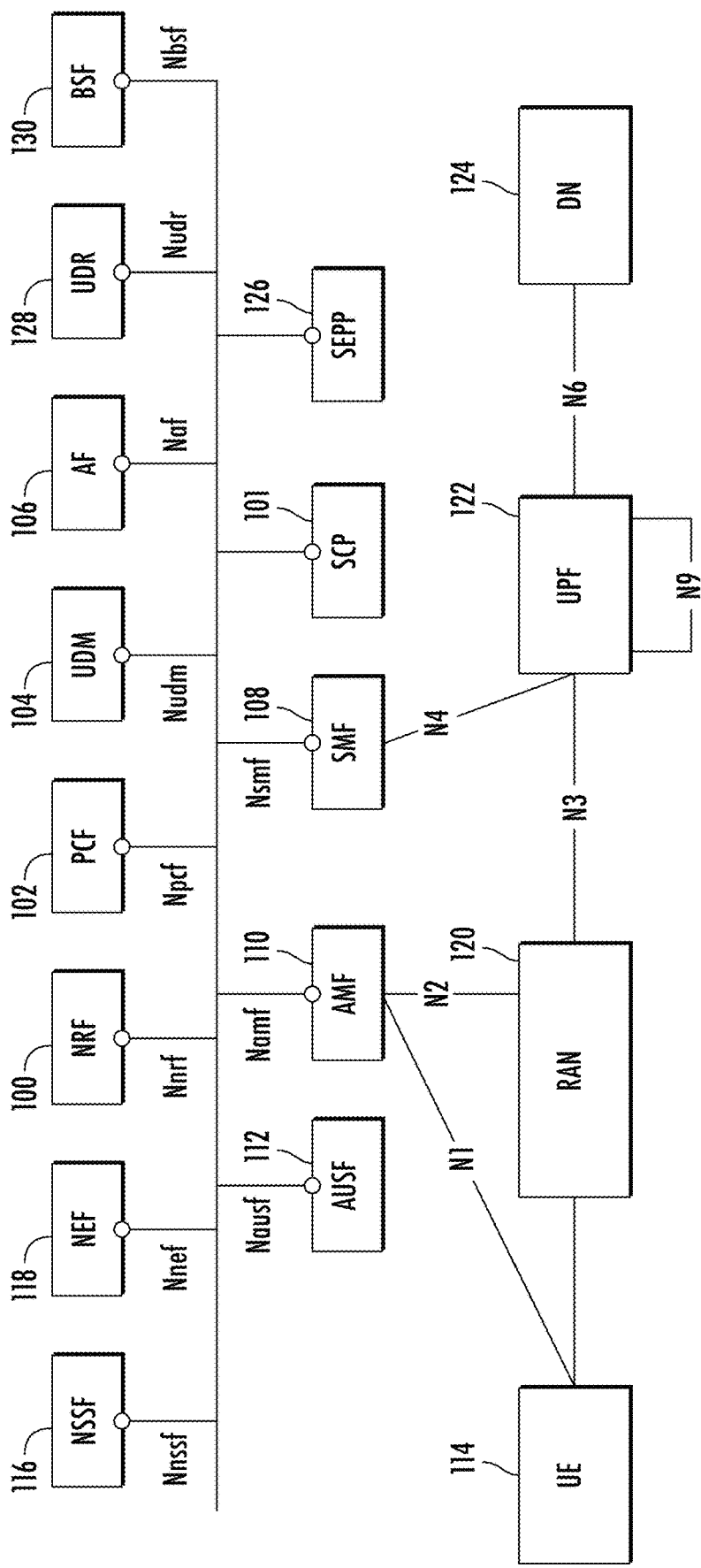
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in 3GPP TS 29.510. The NF or service profile definition includes at least one of a fully qualified domain name (FQDN), an Internet protocol (IP) version 4 (IPv4) address or an IP version 6 (IPv6) address.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management (UDM) function 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

As stated above, one problem that can occur in 5G and other networks is that NF instances report individually determined (by the NF instances) priority values to the NRF using the NF register and NF update service operations. The priority value is not calculated/decided based on availability, load, or capacities of instances of a defined network function. As a result, every NF instance may inform the NRF that it has the highest priority. The NRF relies on the priority data as true data from network functions when processing and considering different instance profiles of network functions. In addition, consumer NFs that obtain the NF profiles from the NRF rely on the priorities reported by the NF instances when selecting an NF instance to provide a service. It should also be noted that priority data can be sent at different levels defined by 3GPP, such as NFProfilelevel, NFServicelevel and xxxInfoattributes, defined for a network function.

There is no mechanism available in 3GPP standards by which network function instances can decide or determine relative priorities with respect to each other dynamically by considering priority, capacity, and load of different network instances (for a defined network function type) present in the network deployment.

Impacts on the 5G network that can be caused by reporting of this unrealistic priority information to the NRF include consumer NFs not being able to discover priority values of NF instances the reflect the relative number, capacities, or loads of the NF instances. Another impact occurs during producer NF selection, as priority and capacity are attributes used in NF selection. If the priority values do not reflect the relative current abilities of producer NFs to handle service requests, sub-optimal distribution of service requests among producer NF instances may result. Another impact of the failure of producer NF instances to report relative priorities is that the NRF relies on the priorities reported by the producer NF instances and delivers this data to consumer NFs during the NF discover service operations, which may again result in sub-optimal producer NF selection. When the consumer NFs process the producer NF profiles shared by NRF, the consumer NFs may select a sub-optimal target network function profile due to unrealistic priorities shared by the producer NFs.

One exemplary solution proposed herein introduces a mechanism and network element referred to as the priority resolver, which can help different instances of a network function obtain priorities that are relative to each other. During boot-up, different NF instances of an NF can provide their capacity, load and service details to the priority resolver. The priority resolver applies its algorithms on the data and determines the priorities for different instances of the network function and sends a relative priority value to each NF Instance. NF instances may also periodically provide load and capacity data to metric server. The metric server has latency details, congestion details, and details as to when NF instances are brought into and out of service. The priority resolver can obtain this data from the metric server and can adjust or update the NF instance priority accordingly.

After NF instance(s) receive their relative priorities from the priority resolver, the NF instances register with the NRF using the 3GPP-defined NF register service operation using dynamic priority data. The NF instances may also continually send updated load and capacity information to the priority resolver, and the priority resolver may continually adjust or update the relative priorities of the NF instances and communicate the updated relative priorities to the NF instances. The NF instances may communicate the updated relative priorities to the NRF using the NF update service operation. NF instances can obtain updated relative priorities periodically by asking the priority resolver, or the priority resolver may push priority update response messages to the NF instances when new relative priorities are calculated is response to updates in data (number, load, and/or capacity) from different NF instances or the metric server. In one example, NF instances may request and receive initial relative priorities at bootup of the NF instances. When any of the NF instances or the metric server determines that a change in number, load, or capacity of the NF instances has occurred, the NF instance or metric server may communicate the new number, load, and/or capacity values to the priority resolver, which computes new relative priorities for the NF instances, and communicates the new relative priorities to all of the NF instances whose relative priorities are changed by the change in number, load, and/or capacity of the NF instances.

The priority resolver can determine the relative priorities at the NF profile level, the service profile level, and/or the xxxInfoLevel among the different instances of a network function. The priority resolver can be implemented as a stand-alone network function, or the priority resolver may be co-located with other network functions, such as the NRF, the SCP, or the network data analytics function (NWDAF).

Figure 2:
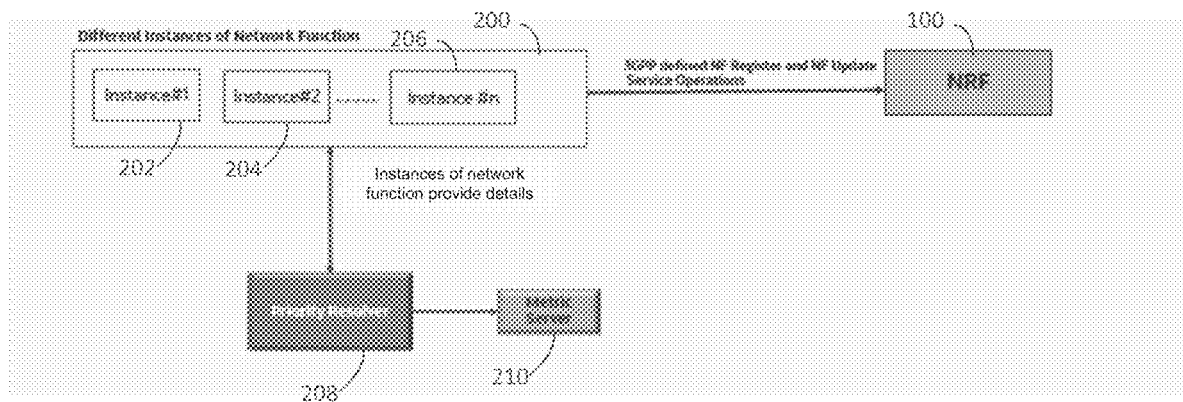
FIG. 2 is a network diagram illustrating an exemplary priority resolver interacting with NF instances to resolve priority among the NF instances.

FIG. 2 is a network diagram illustrating an exemplary network architecture including a priority resolver. Referring to FIG. 2, an NF 200 includes a plurality of NF instances 202, 204 and 206. Each of the NF instances requests and obtains a relative priority value from a priority resolver 208. Priority resolver 208 may determine the relative priority of each NF instance 202, 204, and 206 using an algorithm that relies on criteria, such as capacity, load and/or other parameters. Priority resolver 208 may obtain the parameters used to determine the relative priorities from NF instances 202, 204, and 206 and/or from metric server 210. Once NF instances 202, 204, and 206 obtain their relative priorities, they can provide the relative priorities to NRF 100 in NF register and NF update service operations.

In one example, priority resolver 208 may provide an API for NF instances to request and obtain relative priority values. Table 1 shown below illustrates an example of an API that may be provide by priority resolver 208.

TABLE 1

Priority Resolver API

| Resource URI | HTTP Method | Data Model (Request) | Data Model (Response) | Details |
|---|---|---|---|---|
| {apiRoot}/priority-resolver/v1/nfPriority | PUT | NFPriority Details | NFPriority Details | This API provides a mechanism by which NF instances can provide details to the priority resolver and receive relative priorities in return |

In Table 1, the priority resolver API includes a resource URI, which identifies the target of a priority resolution request. The apiRoot parameter in the resource URI may be a concatenation of scheme (HTTP or HTTPS), the fixed string "//", authority (host and optional port). The host and port parameters are the host and port of the priority resolver. The HTTP method used to request and obtain relative priority is the HTTP PUT method. The NFPriorityDetails provided in the request may include NF-Instance-Id, which is an NF profile attribute that identifies the NF instance. The NFPriorityDetails may further include NF-Type, which is an NF profile attribute that identifies an NF type. The NFPriorityDetails may further include capacity and load, which are attributes that respectively identify the capacity and load of an NF. The NFPriorityDetails may further include NF profile level and NF service level, which are attributes that respectively identify the level of an NF profile and a service level of an NF instance. The NF priority details may include NF instance health parameters in addition to or instead of NF instance load and capacity without departing from the scope of the subject matter described herein. For example, the NF instance health parameters may include congestion and/or latency of an NF instance, as reported by or obtained from the metric server.

Figure 3:
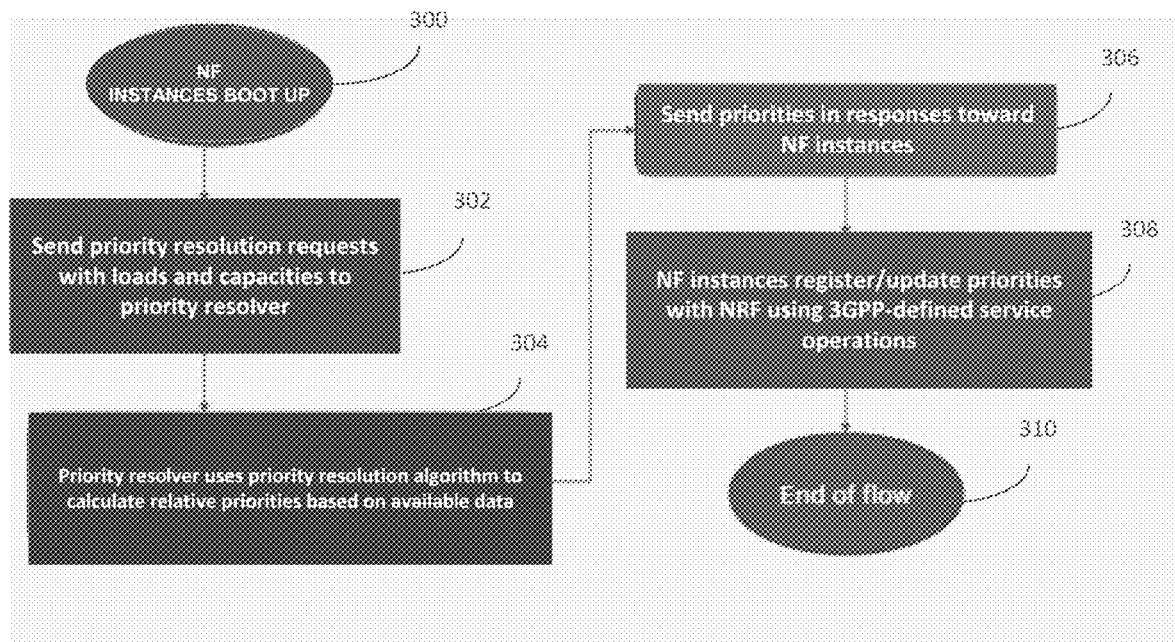
FIG. 3 is a flow chart illustrating an exemplary process for priority resolution among NF instances at boot up of the NF instances.

One example of when NF instances may request relative priorities is during initial boot up of the NF instances. FIG. 3 is a flow chart illustrating an exemplary process for priority resolution among NF instances at initial boot up of the NF instances. Referring to FIG. 3, in step 300, a plurality of NF instances boot up. In this example, the NF instances are assumed to be NF instances of the same type that are capable of providing a service in the network. The NF instances may be any of the NF instance types described above with regard to FIG. 1. Each NF instance may be configured with an NF profile including attributes, such as NF instance ID, which identifies the NF instance, NF type, which identifies the type of NF, capacity, which provides a metric of the processing capacity of each NF instance, and priority, which provides an indication of operator configured priority of each NF instance.

In step 302, the NF instances send priority resolution requests to the priority resolver. For example, each NF instance may generate and send a priority resolution request using the priority resolver API described above with regard to Table 1. The priority resolution requests may each include an NF instance ID attribute value, an NF type attribute value, a capacity attribute value, and a load attribute value. Because the NF instances just booted up, the load attribute value may be at or near zero. The NF instance ID, NF type, and capacity attribute values may include values configured by the network operator for each NF instance.

In step 304, the priority resolver uses a priority resolution algorithm and received data to calculate a relative priority for each of the NF instances. The priority resolution algorithm, in one example, may utilize the load and capacity attribute values provided by each NF instance to compute load/capacity metric for each NF instance. The priority resolver may place the load/capacity metric in a list and sort the list in order of descending load/capacity metric values. The priority resolver may then compute the relative priority of each NF instance using the positions of the load/capacity metrics in the sorted list. Additional details of the priority resolution algorithm and example calculations will be described in detail below.

In step 306, the priority resolve communicates the relative priorities to the NF instances. For example, the priority resolver may formulate and send priority resolution responses, each including a computed relative priority value, to the NF instance. The priority resolution responses may be formulated according to the API illustrated above with regard to Table 1. The NF instances may receive the priority resolution responses, extract the relative priority attribute values, and either populate or replace the priority attribute values in the NF profiles or service profiles of each NF instance.

In step 308, the NF instances register or update their priorities with the NRF using the NF register or NF update service operations. Because the example process in FIG. 3 occurs at initial bootup of the NF instances, the NF instances will not likely be registered with the NRF, and the NF instances may invoke the NF register service operation by sending NF register requests to the NRF to register each NF instance with the NRF. The NF register request may include the NF profile and/or the service profile of each NF instance. Rather than having statically configured priority attribute values, the NF register requests may each include the relative priority attribute values computed by the priority resolver. If NF instances are currently registered with the NRF, the NF instances may utilize the NF update service operation to communicate their relative priorities to the NRF. The NF update service operation involves each NF sending an NF update request to the NRF. The NF update request may include all or part of the NF profile of the NF instance being updated. The NF profile or partial NF profile may include the relative priority value computed for each NF instance.

In step 310, the process for priority resolution at initial bootup of the NF instances ends. It is understood that the process in FIG. 3 (except for step 300) may be performed continually so that the NRF maintains updated relative priority values of the NF instances. Because the NRF maintains updated relative priorities of the NF instances, the priority values delivered to consumer NFs during the NF discovery service operation are more likely to be reflective of the relative loads and capacities of each NF instances than if static operator configured priority values were used. As a result, network resources may be more efficiently utilized.

As stated above, each NF instance may update its relative priority with the NRF in response to a change in NF instance capacity in the network and/or a change in loading of NF instances in the network. For example, in a cloud deployment of NF instances, new NF instances may be instantiated and/or taken out of service by the cloud network operator as NF instance service needs change. When a new NF instance is added to the network, the new NF instance and the existing NF instances that provide the same service as the new NF instance may requests and obtain relative priority attribute values from the priority resolver. Similarly, when an NF instance is removed from service or the load on existing NF instances changes more than an operator-defined threshold amount, the NF instances may request and obtain relative priorities from the priority resolver.

Figure 4:
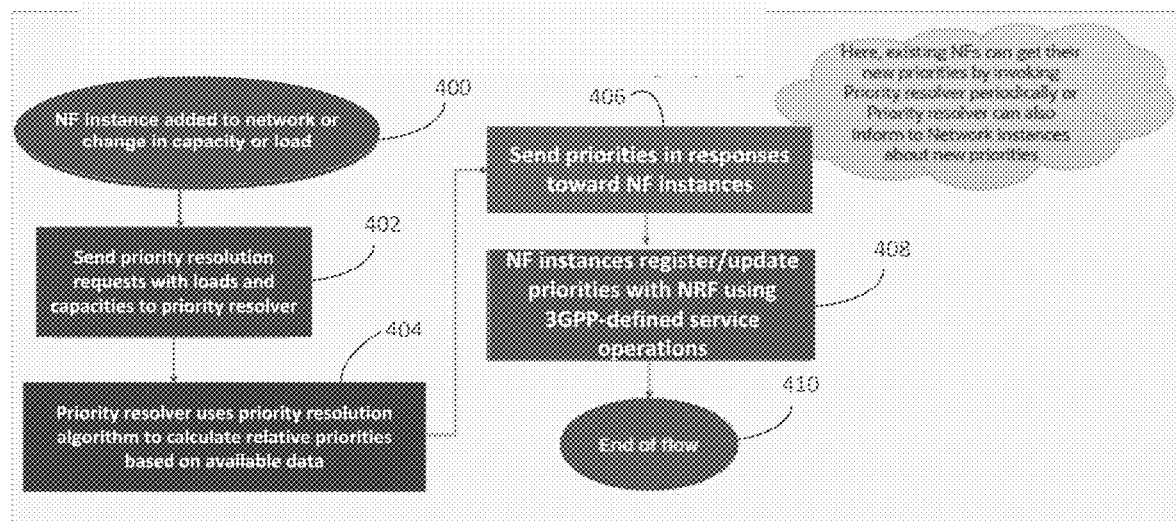
FIG. 4 is a flow chart illustrating an exemplary process for priority resolution among NF instances in response to addition of NF instances to the network or a change in capacity or load of the NF instances.

FIG. 4 is a flow chart illustrating an exemplary process for priority resolution among NF instances in response to addition of an NF instance to the network (or removal of an NF instance from the network) or other factor that changes load or capacity of the NF instances in the network. Referring to FIG. 4, in step 400, the process includes detecting addition or deletion of an NF instance from the network or other event effecting a change in NF instance capacity or load. For example, each NF instance may be configured to detect when its load changes by more than a threshold amount and/or to inform other NF instances of an NF instance addition or deletion event.

In step 402, the process includes the NF instances send priority resolution requests to the priority resolver. For example, each NF instance may generate and send a priority resolution request using the priority resolver API described above with regard to Table 1. The priority resolution requests may each include an NF instance ID attribute value, an NF type attribute value, a capacity attribute value, and a load attribute value. Because the NF instances just booted up, the load attribute value may be at or near zero. The NF instance ID, NF type, and capacity attribute values may include values configured by the network operator for each NF instance.

In step 404, the priority resolver uses the priority resolution algorithm and received data to calculate a relative priority for each of the NF instances. The priority resolution algorithm, in one example, may utilize the load and capacity attribute values provided by each NF instance to compute load/capacity metric for each NF instance. The priority resolver may place the load/capacity metric in a list and sort the list in order of descending load/capacity metrics. The priority resolver may then compute the relative priority of each NF instance using the positions of the load/capacity metrics in the sorted list. Additional details of the priority resolution algorithm and example calculations will be described in detail below.

In step 406, the priority resolver communicates the relative priorities to the NF instances. For example, the priority resolver may formulate and send priority resolution responses, each including a computed relative priority value, to the NF instance. The priority resolution responses may be formulated according to the API illustrated above with regard to Table 1. The NF instances may receive the priority resolution responses, extract the relative priority attribute values, and either populate or replace the priority attribute values in the NF profiles of each NF instance.

In step 408, the NF instances register or update their priorities with the NRF using the NF register or NF update service operations. If a new NF instance is added to the network, the new NF instance may invoke the NF register service operation by sending an NF register request to the NRF to register the NF instance with the NRF. The NF register request may include the NF profile and/or the service profile of each NF instance. Rather than having statically configured priority attribute values, the NF register request may include the relative priority attribute value computed by the priority resolver. If an NF instance is currently registered with the NRF, the NF instance may utilize the NF update service operation to communicate its relative priority to the NRF. The NF update service operation involves each NF sending an NF update request to the NRF. The NF update request may include all or part of the NF profile of the NF instance being updated. The NF profile or partial NF profile may include the relative priority value computed for each NF instance.

In step 410, the process for priority resolution after a change in number, load, or capacity of the NF instances ends. Because the process in FIG. 4 can occur each time NF instance capacity, load, or number changes in the network, the likelihood of relative priorities maintained with the NRF being up to date increases over static priority configuration approaches.

As described above, the priority resolution algorithm used by the priority resolver may utilize NF instance load and capacity and applies a mechanism to decide the priorities of different instances of a network function. In one example, the priority resolver may first calculate a load/capacity metric value using the following equation:

$$\text{load/capacity metric value} = x - ((y/100)^*x), \quad (1)$$

where 'x' is capacity of an NF instance and 'y' is load of an NF instance. The priority resolver calculates the load/capacity metric for each NF instance in a set of NF instances whose relative priorities are being calculated. The priority resolver places the load/capacity metrics in a list and sorts the list in descending order, such that the NF instances with higher load/capacity metric values are nearer to the beginning of the list. The priority resolver may select a relative priority value from within a 3GPP-defined range of 0-65535 for the NF instance whose load/capacity metric is located first in the list. For each NF instance whose load capacity metric is located after the first position in the list, the priority resolver may determine the relative priority values using the following equation:

$$\text{Relative Priority}(n) = \text{Relative Priority}(n-1) + 1, \quad (2)$$

where n is an integer of at least 2, representing the position of load/capacity metric in the sorted list created using Equation 1, priority(n) is the relative priority being computed for the NF instance whose load/capacity metric is located at an nth position in the list, and priority(n−1) is a relative priority of an NF instance whose load/capacity metric value is located at an (n−1)th position in the list. The NF instance whose load/capacity metric is first in the list will be assigned a priority value selected from the range of 0 to 65535 in accordance with 3GPP TS 29.510. The NF instance whose load/capacity metric is second in the list will be assigned a priority of 1 more than the priority of the NF instance whose load/capacity metric is first in the list, and so forth. It should be noted that the lower the value of the relative priority, the more preferred the NF instance, in accordance with 3GPP standards.

Figure 5:
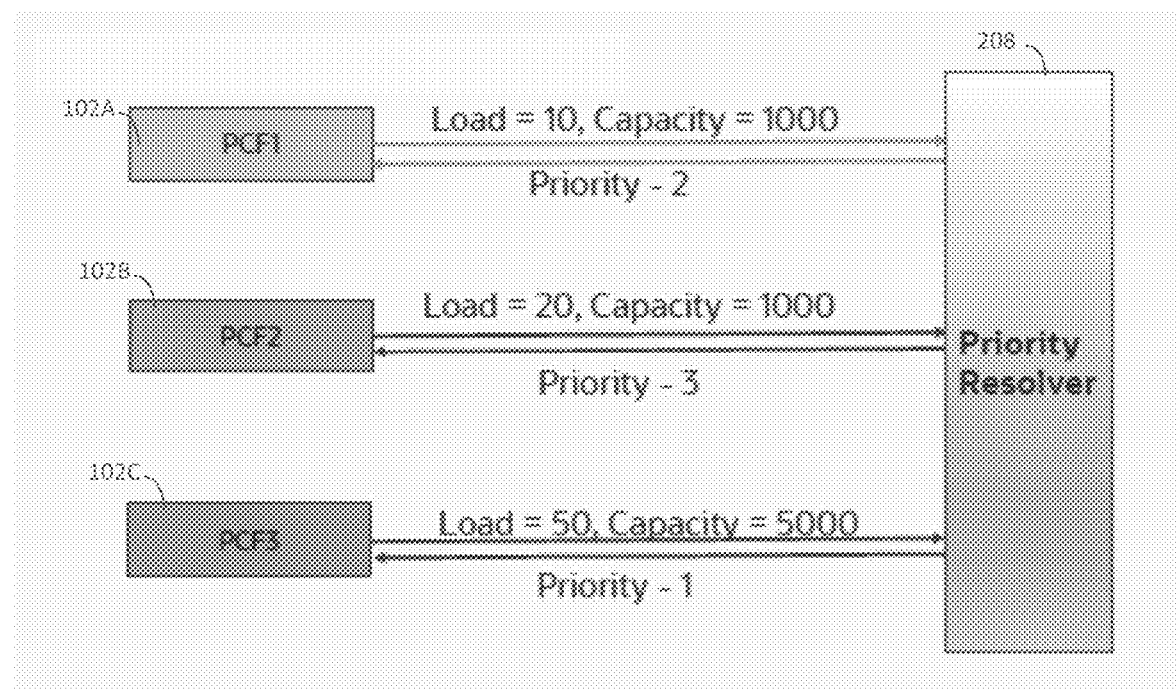
FIG. 5 is a network diagram illustrating an example of priority resolution among NF instances.

FIG. 5 illustrates an example where three PCF instances 102A, 102B, and 102C send priority resolution requests with load and capacity values to priority resolver 208, and priority resolver 208 calculates and returns three relative priority values in priority resolution responses. Referring to FIG. 5, PCF instance 102A sends a priority resolution request to priority resolver 208. The priority resolution request includes a load value of 10 and a capacity value of 1000. Using Equation 1, priority resolver 208 computes the load/capacity metric for PCF instance 102A as follows:

$$\begin{aligned}\text{load/capacity metric } (PCF\ 102A) &= x - ((y/100)*x) \\ &= 1000 - ((10/100)*1000) \\ &= 1000 - (.1*1000) \\ &= 1000 - 100 \\ &= 900\end{aligned}$$

PCF instance 102B sends a priority resolution request to priority resolver 208. The priority resolution request includes a load value of 20 and a capacity value of 1000. Using Equation 1, priority resolver 208 computes the load/capacity metric for PCF instance 102B as follows:

$$\begin{aligned}\text{load/capacity metric } (PCF\ 102B) &= x - ((y/100)*x) \\ &= 1000 - ((20/100)*1000) \\ &= 1000 - (.2*1000) \\ &= 1000 - 200 \\ &= 800\end{aligned}$$

PCF instance 102C sends a priority resolution request to priority resolver 208. The priority resolution request includes a load value of 50 and a capacity value of 5000. Using Equation 1, priority resolver 208 computes the load/capacity metric for PCF instance 102C as follows:

$$\begin{aligned}\text{load/capacity metric } (PCF\ 102C) &= x - ((y/100)*x) \\ &= 5000 - ((50/100)*5000) \\ &= 5000 - (.5*5000) \\ &= 5000 - 2500 \\ &= 2500\end{aligned}$$

Once priority resolver 208 computes the load/capacity values for each of the NF instances, priority resolver 208 places the load/capacity values in a list and sorts the list in ascending order. The following is an example of such a list using the load/capacity metric values computed for FIG. 4:

| 2500 | 900 | 800 |
| --- | --- | --- |

Because the load/capacity metric for PCF 102C is first in the list, the relative priority for PCF 102C will be selected to be a value selected from the range of 0 to 65535. In this example, the priority for PCF 102C is set to 1

The load/capacity metric for PCF 102C is second in the list. Accordingly, priority resolver 208 calculates the relative priority for PCF 102A as follows:

Relative Priority(n)=Relative Priority(n−1)+1

Relative Priority(2)=Relative Priority(1)+1

Relative Priority(2)=1+1

Relative Priority(2)=2

Thus, PCF 102A has the second most preferred relative priority value.

The load/capacity metric for PCF 102A is third in the list. Accordingly, priority resolver 208 calculates the relative priority for PCF 102B as follows:

Relative Priority($n$)=Relative Priority($n$−1)+1

Relative Priority(3)=Relative Priority(2)+1

Relative Priority(3)=2+1

Relative Priority(3)=3

Thus, PCF 102B has the third most preferred relative priority value. PCFs 102A, 102B, and 102C report the relative priority values to the NRF, and the NRF provides the relative priority values to consumer NFs and SCPs in NF discovery responses. The consumer NFs and SCPs may utilize the relative priority values as at least one of the criteria for selecting producer NFs to provide a service and will send service based interface (SBI) requests to the selected producer NF. Because the relative priority values are indicative of the relative loads and capacities of the NF instances, NF selection is more likely to result in efficient allocation of producer NF resources than if static priority values are used. It should be noted that priority resolver 208 may resolve priorities at the NF profile level or the service profile level. In addition, the relative priority values computed by priority resolver 208 may be used as the values for the priority attributes in the NF profile, the NF service profile, and the xxxinfoLevel, as defined in 3GPP standards. Priority resolver 208 may also use NF instance health parameters other than load and capacity to determine relative priorities of NF instances. Examples of such parameters include resources (e.g., memory and/or processing resources), key performance indicators (KPIs) defined by a network operator, latency, congestion, etc. Such health parameters may be used in addition to load and capacity in the event that the relative priorities computed using load and capacity result in equal priorities being assigned to two or more NF instances. Alternatively, the NF health parameters other than load and capacity may be used instead of load and capacity to determine the relative priorities of NF instances.

Figure 6:
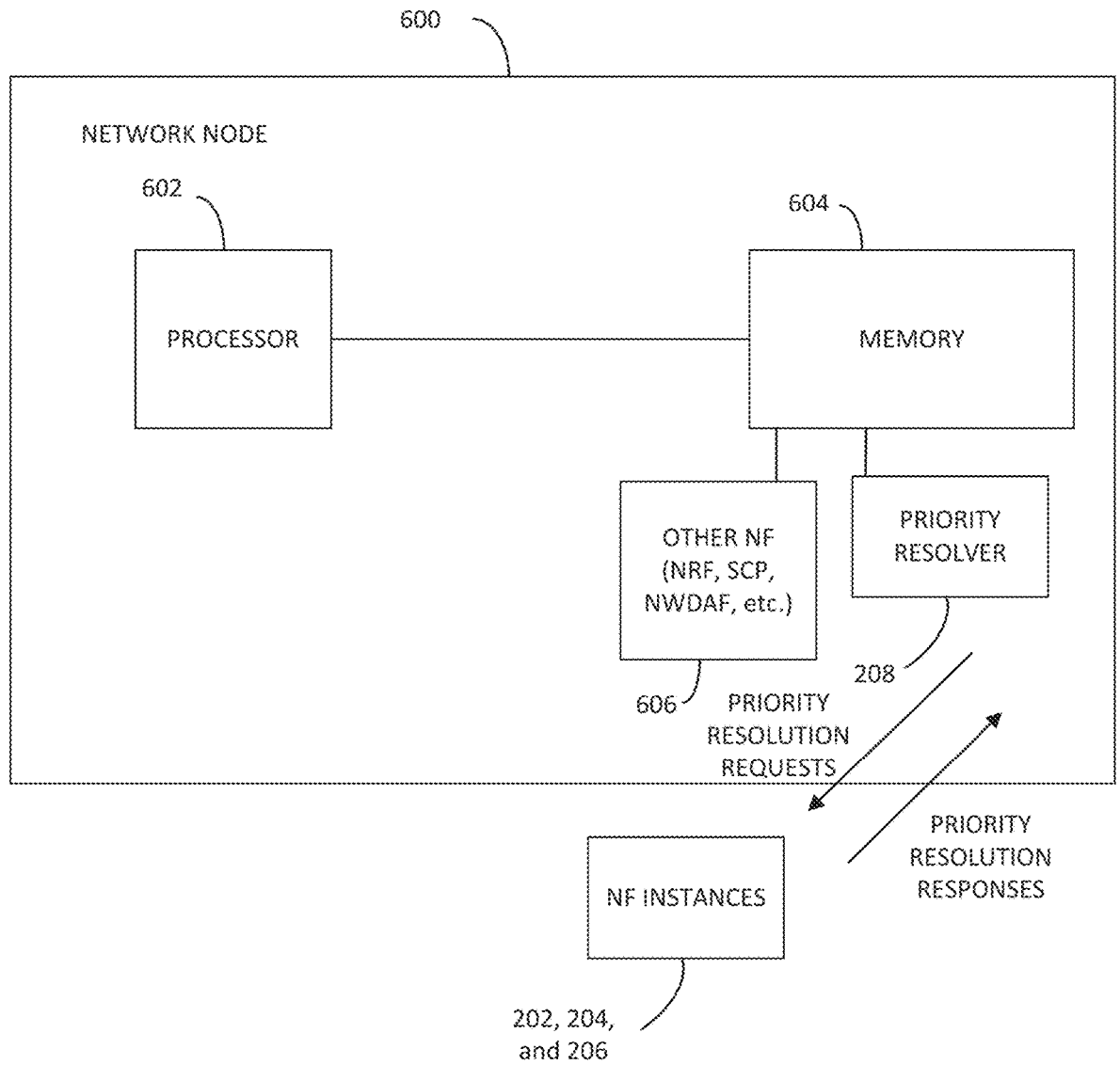
FIG. 6 is a block diagram illustrating an exemplary architecture for a priority resolver.

FIG. 6 is a block diagram illustrating an exemplary architecture for a network node that implements a priority resolve are and optionally other network functions. Referring to FIG. 6, network node 600 includes at least one processor 602 and a memory 604. Priority resolver 208 may be implemented using computer executable instructions stored in memory 604 and executed by processor 602. Priority resolver 208 may perform the operations described herein for resolving priorities among NF instances, such as NF instances 202, 204, and 206. Network node 600 may optionally implement other network functions, such as an NRF, SCP or NWDAF, that can be efficiently co-located with priority resolver 208. Alternatively, priority resolver 208 may be implemented as a stand-alone network function, i.e., on a network node that does not implement other network functions other than priority resolver 208.

Figure 7:
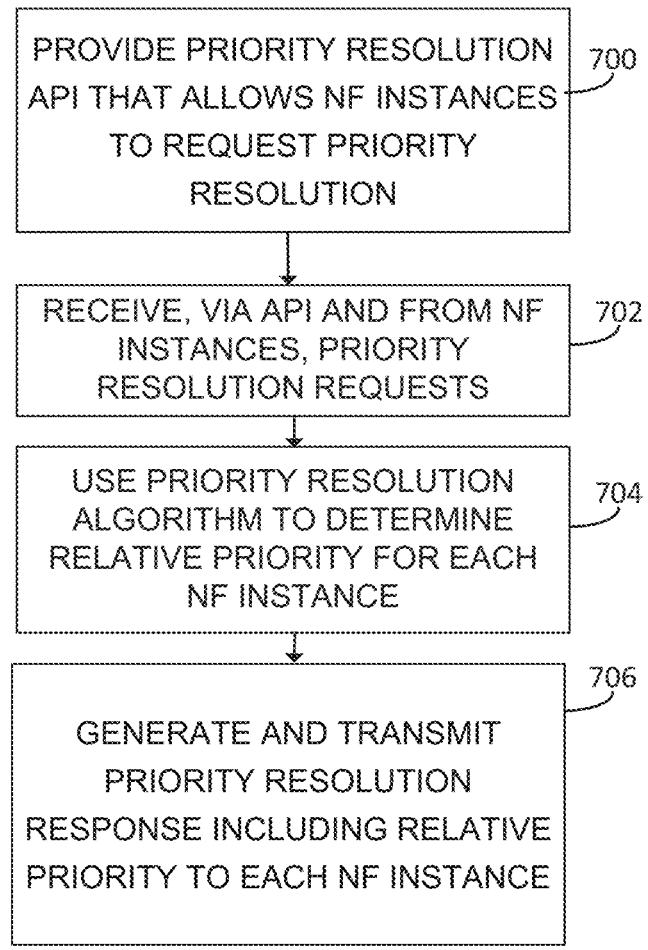
FIG. 7 is a flow chart illustrating an exemplary process performed by a priority resolver in resolving priorities among NF instances.

FIG. 7 is a flow chart illustrating an exemplary process implemented by priority resolver 208 for resolving priorities among NF instances. Referring to FIG. 7, in step 700, the process includes providing a priority resolution application programming interface (API) that allows NF instances to request priority resolution. For example, priority resolver 208 may provide an API, such as that illustrated above in Table 1, that allows NF instances to request and receive relative priority values.

In step 702, the process includes receiving, via the API and from a plurality of NF instances, requests for priority resolution. For example, priority resolver 208 may receive priority resolution requests from NF instances 202, 204, and 206, where each of the priority resolution requests includes load and capacity information for the NF instances. The priority resolution requests may be formatted according to the API described above with regard to Table 1.

In step 704, the process includes using a priority resolution algorithm to determine a relative priority for each of the NF instances. For example, priority resolver 208 may use Equation 1 above to compute load/capacity metric values for each of the NF instances and place the load/capacity metric values in a list. Priority resolver 208 may then sort the list in order of descending priority. Priority resolver 208 may then use Equation 2 above to assign relative priorities to each of the NF instances based on the position of the load/capacity metric values in the sorted list.

In step 706, the process includes generating and transmitting to each of the NF instances NF instance a priority resolution response including the relative priority determined for the NF instance. For example, priority resolver 208 may generate priority resolution responses for the NF instances using the API described above with regard to Table 1 and may transmit a priority resolution response to each of the NF instances from which a priority resolution request was received. The priority resolution request transmitted to each NF instance may include the relative priority value computed for that NF instance.

One exemplary advantage of the subject matter described herein includes the providing of a mechanism for resolving relative priorities among producer NFs. Using such relative priorities is advantageous over using statically configured priorities because NF resources will be more efficiently utilized. Because NF resources will be more efficiently utilized, hardware requirements in the network may decrease. Another advantage over using statically configured priorities is that consumer NFs and the NRF are more likely to select producer NFs with the most available resources to handle a service request. The subject matter described herein may be particularly well suited to implement 5G technology latency requirements, especially for ultra-low latency slices. During traffic surges, the subject matter described herein can help optimize NF performance. The subject matter described herein is backward compatible with 3GPP standards and can be implemented in a network even when some of the NFs do not support the priority resolver API.

The disclosure of each of the following references is hereby incorporated herein by reference in its entirety.

REFERENCES 1. 3rd Generation Partnership Project; Technical Specification Group Core Network and Terminals; 5G System; Network Function Repository Services; Stage 3 (Release 17) 3GPP TS 29.510 V17.1.0 (2021-03).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for resolving priorities among network function (NF) instances, the method comprising:
at a priority resolver implemented using at least one processor:
providing a priority resolution application programming interface (API) that allows NF instances to request priority resolution;
receiving, via the API and from a plurality of NF instances, requests for priority resolution, wherein each of the requests for priority resolution is a request from an NF instance to determine its own priority;
using a priority resolution algorithm to determine a relative priority for each of the NF instances; and
generating and transmitting to each of the NF instances a priority resolution response including the relative priority of the NF instance determined by the priority resolution algorithm for the NF instance.

2. The method of claim 1 wherein providing the API includes providing an interface for the NF instances to provide NF priority details to the priority resolver.

3. The method of claim 1 wherein using the priority resolution algorithm to determine a relative priority for each of the NF instances includes assigning a relative priority value to each of the NF instances based on relative values of at least one NF instance health parameter.

4. The method of claim 3 wherein the at least one NF health instance parameter includes load and capacity and wherein assigning a relative priority value to each of the NF instances based on relative values of the at least one NF instance health parameter includes calculating a load/capacity metric value for each of the NF instances using the following equation: load/capacity metric value=$x-(y/100*x)$, where x is capacity of an NF instance and y is load on the NF instance.

5. The method of claim 4 wherein assigning a relative priority value to each of the NF instances based on relative values of the at least one NF health parameter includes:
generating a list of the load/capacity metric values of the NF instances in order of descending load/capacity metric values; and
assigning a relative priority value to each of the NF instances based on a position of the load/capacity metric value for each of the NF instances in the list.

6. The method of claim 5 wherein assigning a relative priority value to each of the NF instances in the list includes assigning a relative priority value within a Third Generation Partnership Project (3GPP)-defined range of values to an NF instance whose load/capacity metric value is in a first position in the list, and, for each NF instance having a load/capacity metric value after the first position in the list, assigning a relative priority value using the following equation: relative priority(n)=priority(n−1)+1, where n is an integer of at least 2, representing a position in the list of a load/capacity metric value for the NF instances whose load/capacity metric values are located after the first position in the list, priority(n) is the relative priority being computed for the NF instance whose load/capacity metric is located at an nth position in the list, and priority(n−1) is a relative priority of an NF instance whose load/capacity metric value is located at an (n−1)th position in the list.

7. The method of claim 1 wherein receiving the requests for priority resolution includes receiving the requests for priority resolution in response to booting up of the NF instances.

8. The method of claim 1 comprising updating the relative priorities in response to a change in number, load, or capacity of the NF instances.

9. The method of claim 1 comprising, at each of the NF instances, receiving one of the priority resolution responses including one of the relative priority values and transmitting an NF register message to an NRF including the one relative priority value to an NF repository function NRF.

10. The method of claim 1 wherein the priority resolver is implemented as a stand-alone network function or is co-located with a network function other than the priority resolver.

11. A system for resolving priorities among network function (NF) instances, the system comprising:
a network node including at least one processor and a memory; and
a priority resolver implemented using the at least one processor for providing a priority resolution application programming interface (API) that allows NF instances to request priority resolution, receiving, via the API and from a plurality of NF instances, requests for priority resolution, wherein each of the requests for priority resolution is a request from an NF instance to determine its own priority, the priority resolver for using a priority resolution algorithm to determine a relative priority for each of the NF instances, and generating and transmitting to each of the NF instances a priority resolution response including the relative priority of the NF instance determined by the priority resolution algorithm for the NF instance.

12. The system of claim 11 the API is configured for the NF instances to provide NF priority details to the priority resolver.

13. The system of claim 11 wherein using the priority resolution algorithm to determine a relative priority for each of the NF instances includes assigning a relative priority value to each of the NF instances based on relative values of at least one NF instance health parameter.

14. The system of claim 13 wherein the at least one NF instance health parameter includes load and capacity and wherein assigning a relative priority value to each of the NF instances based on relative values of the NF instance health parameter includes calculating a load/capacity metric value for each of the NF instances using the following equation: load/capacity metric value=$x-(y/100*x)$, where x is capacity of an NF instance and y is load on the NF instance.

15. The system of claim 14 wherein the priority resolver is configured to assign a relative priority value to each of the NF instances by:
generating a list of the load/capacity metric values of the NF instances in order of descending load/capacity metric values; and
assigning a relative priority value to each of the NF instances based on a position of the load/capacity metric value for each of the NF instances in the list.

16. The system of claim 15 wherein the priority resolver is configured to assign a relative priority value within a Third Generation Partnership Project (3GPP)-defined range to an NF instance whose load/capacity metric value is located at a first position in the list, and, for each NF instance having a load capacity metric value located after the first position in the list, compute the relative priority using the following equation: relative priority(n)=priority(n−1)+1, where n is an integer of at least 2, representing a position in the list of a load/capacity metric value for the NF instances whose load capacity metric values are located after the first position in the list, priority(n) is the relative priority being computed for the NF instance whose load/capacity metric is located at an nth position in the list, and priority(n−1) is a relative priority of an NF instance whose load/capacity metric value is located at an (n−1)th position in the list.

17. The system of claim 11 wherein the priority resolver is configured to receive the requests for priority resolution in response to booting up of the NF instances.

18. The system of claim 11 wherein the priority resolver is configured to update the relative priorities in response to a change in number, load, or capacity of the NF instances.

19. The system of claim 11 wherein the priority resolver is implemented as a stand-alone network function or is co-located with a network function other than the priority resolver.

20. A non-transitory computer readable medium having stored thereon executable instructions that when executed by a processor of a computer control the computer to perform steps comprising:
   providing a priority resolution application programming interface (API) that allows network function (NF) instances to request priority resolution;
   receiving, via the API and from a plurality of NF instances, requests for priority resolution, wherein each of the requests for priority resolution is a request from an NF instance to determine its own priority;
   using a priority resolution algorithm to determine a relative priority for each of the NF instances; and
   generating and transmitting to each of the NF instances a priority resolution response including the relative priority of the NF instance determined by the priority resolution algorithm for the NF instance.

* * * * *